(12) United States Patent
Huang et al.

(10) Patent No.: US 9,398,286 B2
(45) Date of Patent: Jul. 19, 2016

(54) MULTI-IMAGE CAPTURE DEVICE CAPTURING IMAGES BY MEANS OF CIRCULAR MOTION

(71) Applicant: National Applied Research Laboratories, Taipei (TW)

(72) Inventors: Chi-Hung Huang, Hsinchu (TW); Yung-Hsiang Chen, Hsinchu (TW); Wei-Chung Wang, Hsinchu (TW); Tai-Shan Liao, Hsinchu (TW); Hsiao-Yu Chou, Taipei (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 679 days.

(21) Appl. No.: 13/655,502

(22) Filed: Oct. 19, 2012

(65) Prior Publication Data

US 2014/0111649 A1  Apr. 24, 2014

(51) Int. Cl.
*H04N 7/18* (2006.01)
*H04N 13/02* (2006.01)
*H04N 5/247* (2006.01)

(52) U.S. Cl.
CPC ........... *H04N 13/0242* (2013.01); *H04N 5/247* (2013.01); *H04N 2213/001* (2013.01)

(58) Field of Classification Search
CPC .............................. H04N 5/232; H04N 5/2254
USPC .................................................... 348/56, 159
See application file for complete search history.

(56) References Cited

U.S. PATENT DOCUMENTS

| 6,556,783 B1 * | 4/2003 | Gelphman | H04N 5/232 348/E5.042 |
| 2013/0070048 A1 * | 3/2013 | Huang | H04N 13/0242 348/36 |

* cited by examiner

*Primary Examiner* — Jamie Atala
*Assistant Examiner* — Masum Billah
(74) *Attorney, Agent, or Firm* — Chih Feng Yeh; Huntington IP Consulting Co., Ltd.

(57) ABSTRACT

A multi-image capture device capturing images by means of circular motion controls the shift movement, along a semi-circular measuring rod, of a moving mechanism by a location control device. Furthermore, a rotary control device is used to control the positioning and image-capturing angle of a second image capture device fixed on the rotary mechanism. Thereby, a first image capture device and the second image capture device are of a co-circle configuration where the optical axis of the first image capture device and the second image capture device overlap to form a center of the co-circle. Such a configuration can broaden the visual range of the image capture device, and allows quick calibration of the image capture device according to positioning of shift movement and image-capturing angles.

10 Claims, 14 Drawing Sheets

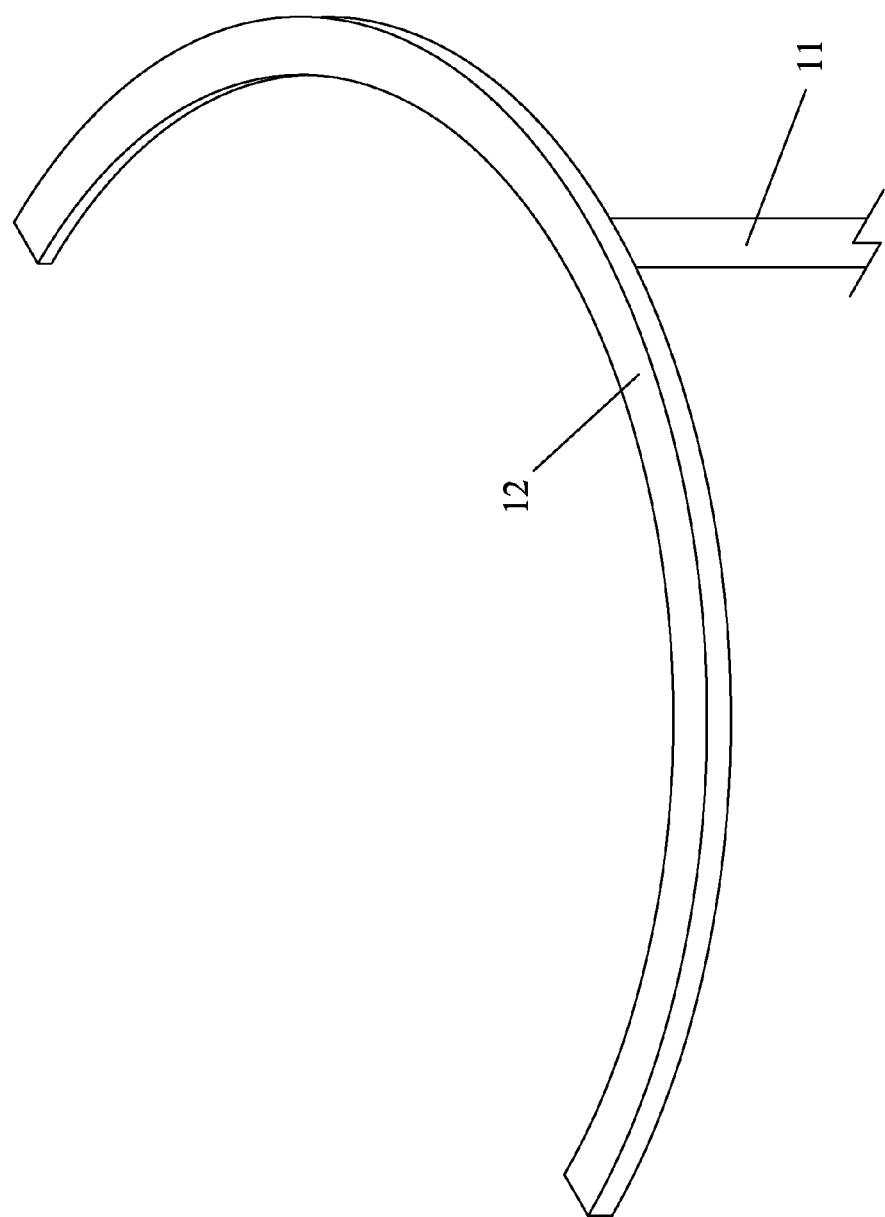

MULTI-IMAGE CAPTURE DEVICE CAPTURING IMAGES BY MEANS OF CIRCULAR MOTION

BACKGROUND OF THE INVENTION

1. Field of the Invention

The present invention relates to multi-image capture device capturing images by means of circular motion.

2. Description of Related Art

Displacement measurement is an important structural monitoring program, and also one of the parameters of safety assessment. The engineering sector has made effort in research and development of fast, convenient and effective measurement of deformation of structure.

Optical methods are always the potential displacement investigation way because optical methods can always perform non-contact measurement. A typical optical method consists of an optical signal source which will be the measurement point such as laser, LED, camera or other special optical devices; a reflective components which can be a mirror, prism, and other optical devices to reflect the light emitted from light sources; a light detecting or signal receiving devices which can be a photodiode, CCD, complementary metal oxide semi-conductor (CMOS) sensor all those who can convert light intensity into signal.

The displacement measurement systems which are implemented from optical methods need not to be contact with the measurement point, greatly reducing the limitation to the location for mounting the instrument and the labor and time needed for setup of the measurement systems. Moreover, it can be applied to remote displacement measurement with high freedom in use and therefore more acceptable by the engineering sector.

Thanks to the rapid development of camera technology in recent years, the image resolution is significantly improved to achieve high degree of accuracy. Image analysis technologies can be realized in reasonable time interval that make the photogrammetry becomes one of the powerful non-contact remote measurement methods. The basic concept of the digital photogrammetry is to locate a specific point of the measurement location in the image, compare the locations of the measurement points obtained at different times, and then calculate the displacement of the measurement points, by this way, it is easy to get good measurement result as long as the measuring points are clear in the image. mage analysis not only has the advantages of non-contact measurement method but also has small impact by the in-situ environment. Therefore, such a technical basis is put into the development of this invention for quick measurement of structural deformation.

In the application of 3D visualization, two images are taken at different locations with two CCD cameras. The relative depth of the whole scene can be re-constructed from two captured 2D images. The typical configuration which is used to set two cameras for non-contact image measurement of structural deformation is a straight bracket with image capture device to adjust the rotation and pitch angle of these two CCD cameras. FIG. 1 is a schematic view of a conventional image measurement structure.

An image measurement structure includes a straight bracket 41 and two image capture devices 42, realizing a physical architecture of a three-dimensional visual measurement. It is used to measure surface deformation of the whole object. Such a technology uses the characteristics of the object surface's images to determine the surface displacement. With combination with camera image capture and image comparison algorithm, the measurement of 3D surface deformation can be completed within the shorted time with best resolution. Any slight surface displacement can be presented in data and images so that the displacement and strain of a single point or the whole surface can be acknowledged.

In the above case, two image capture devices 42 are used for measurement. When the measurement range is out of the visual range of the image capture devices 42, limited images can be observed and the area masked by the object cannot be measured. Measurement of objects having different shapes needs to adjust the positions of the camera and also to perform calibration of the image capture devices for each object.

In summary, it has been long time for the image capture device to suffer limited visual range and need of frequent calibration. Therefore there is a need of a novel means to solve the above problems.

SUMMARY OF THE INVENTION

The object of the present invention is to provide a multi-image capture device which overcomes the shortages in the prior art such as limited visual range and needs for continuous calibration for the image capture device.

In one aspect of the invention, the multi-image capture device capturing images by means of circular motion includes a carrier mechanism and at least one moving mechanism. The carrier mechanism further includes a support frame and a measuring rod. The moving mechanism further includes a moving base, a rotary mechanism, a location control device and a rotary control device.

The carrier mechanism is of semi-circular shape. A fixture base is provided at a center of the measuring rod. The center of the measuring rod connects to the support frame. The fixture base is used to sustain a first image capture device.

The moving mechanisms are respectively mounted on the measuring rod, with one being at a left side of the fixture base and the other at a right side of the fixture base, in a manner of being able to move along the measuring rod. At least one of the moving mechanisms has a moving base consisting of a shell, two movable pulleys and a positioning pulley. A right side and a left side of the shell respectively have a through hole. The movable pulleys are mounted inside a front of the shell. The positioning pulley is mounted inside a rear of the shell. The measuring rod penetrates through the through hole, and the moving base is driven respectively by the movable pulleys and the positioning pulley to the measuring rod at the right side and left side of the fixture base. The rotary mechanism of the moving mechanism is mounted at a front of the moving base and used to fix a second image capture device. The location control device connects to the positioning pulley to control the rotation of the positioning pulley so as to control shift movement along the measuring rod and positioning of the second image capture device fixed on the rotary mechanism. The rotary control device, used to control the rotation of the rotary mechanism to control the rotation of the rotary mechanism so as to control the image-capturing angle and positioning of the second image capture device fixed on the rotary mechanism.

With the control of positioning of shift movement and image-capturing angle of the second image capture device by the location control device and the rotary control device, the first image capture device and the second image capture devices are of a semi-circular configuration which the central optical axis of the first image capture device and the second image capture devices overlap right at the center of a semi-circular.

The difference between the invention and the prior art are as follows. According to the invention, the moving mechanism moves along the semi-circular measuring rod, the moving mechanism controlled by the location control device positions while the semi-circular measuring rod moves, and the rotary control device control the positioning of the angle of image capturing of the second image capture device fixed on the rotary mechanism. Thereby, the first image capture device and the second image capture devices are of a co-circle configuration which the central optical axis of the first image capture device and the second image capture devices overlap at a center of the co-circle. Such a configuration can broaden the visual range of the image capture device, and allows quick calibration of the image capture device according to positioning of shift movement and image-capturing angles.

Such a technical means achieves some effects that the visual range is broadened and the calibration of the image capture device can be quickly carried out.

BRIEF DESCRIPTION OF THE DRAWINGS

FIG. 3 is a perspective of a carrier mechanism of a multi-image capture device capturing images by means of circular motion according to one embodiment of the invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
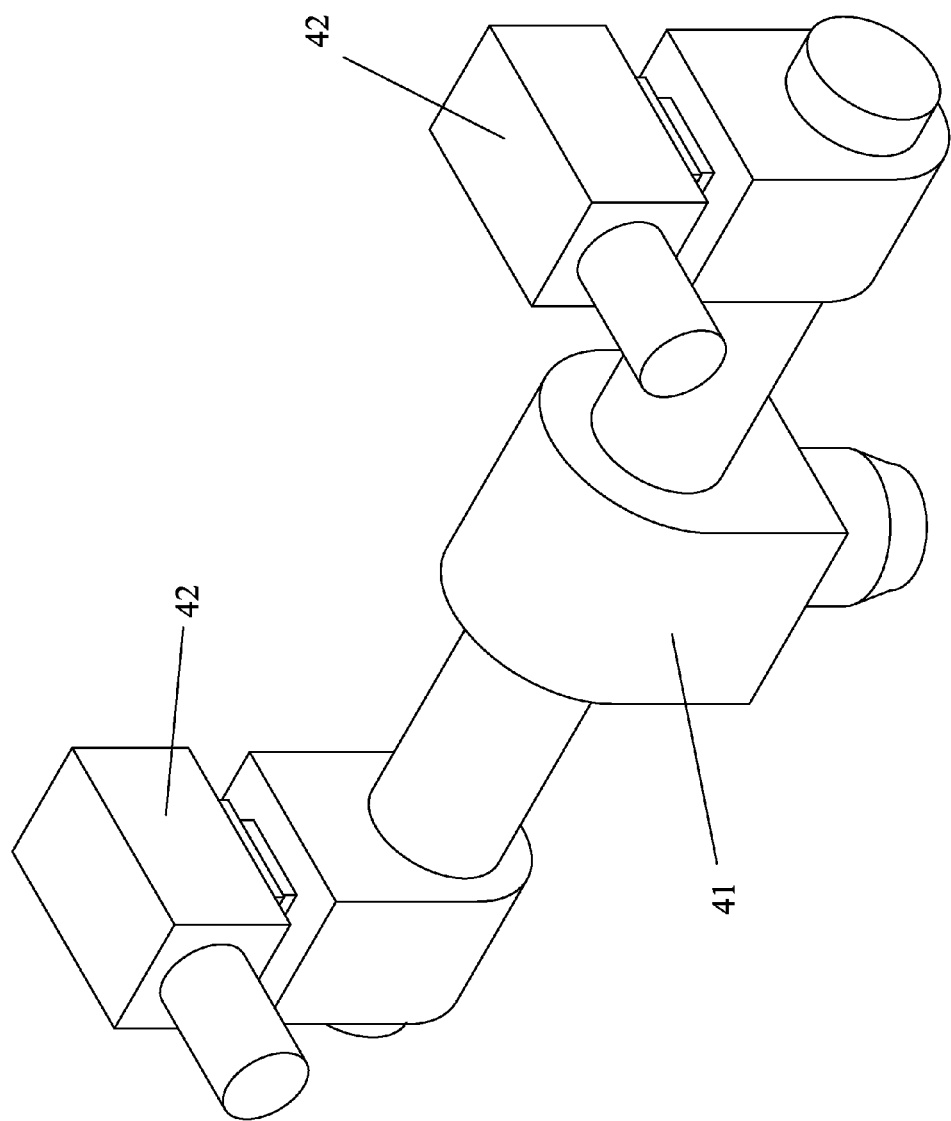
FIG. 1 is a schematic view of a conventional image measuring structure.
Figure 2:
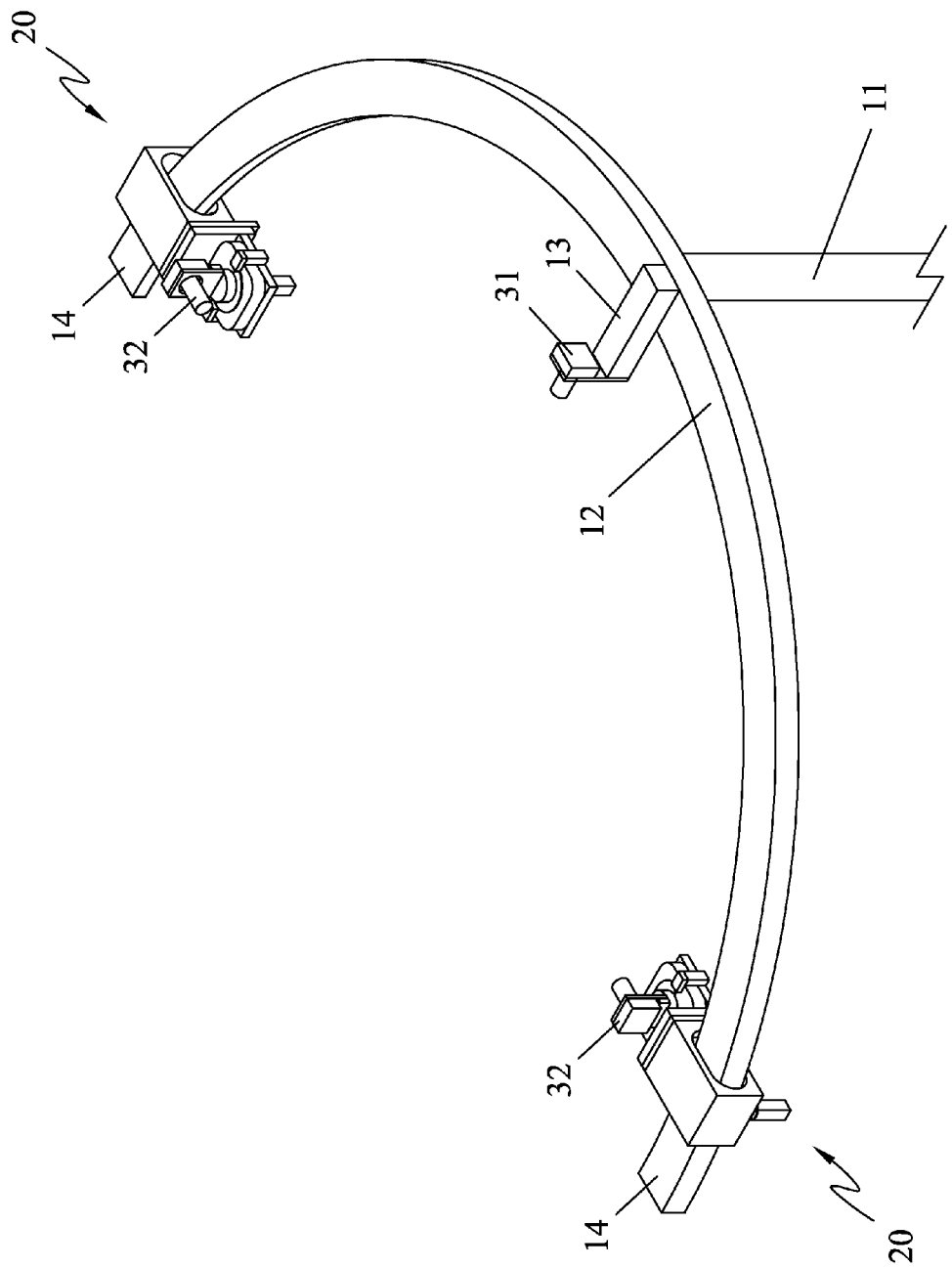
FIG. 2 is a perspective view of a multi-image capture device capturing images by means of circular motion according to one embodiment of the invention.

Here below will disclose a multi-image capture device capturing images by means of circular motion with references to FIG. 2 and FIG. 3. FIG. 2 is a perspective view of a multi-image capture device capturing images by means of circular motion according to one embodiment of the invention. FIG. 3 is a perspective of a carrier mechanism of a multi-image capture device capturing images by means of circular motion according to one embodiment of the invention.

According to one embodiment of the invention, the multi-image capture device capturing images by means of circular motion includes a carrier mechanism 10 and a moving mechanism 20. The carrier mechanism 10 further includes a support frame 11 and a measuring rod 12. The measuring rod 12 is of a semi-circular shape. The support frame 11 connects to a center of the measuring rod 12 so as to support and sustain the measuring rod 12.

Figure 4A:
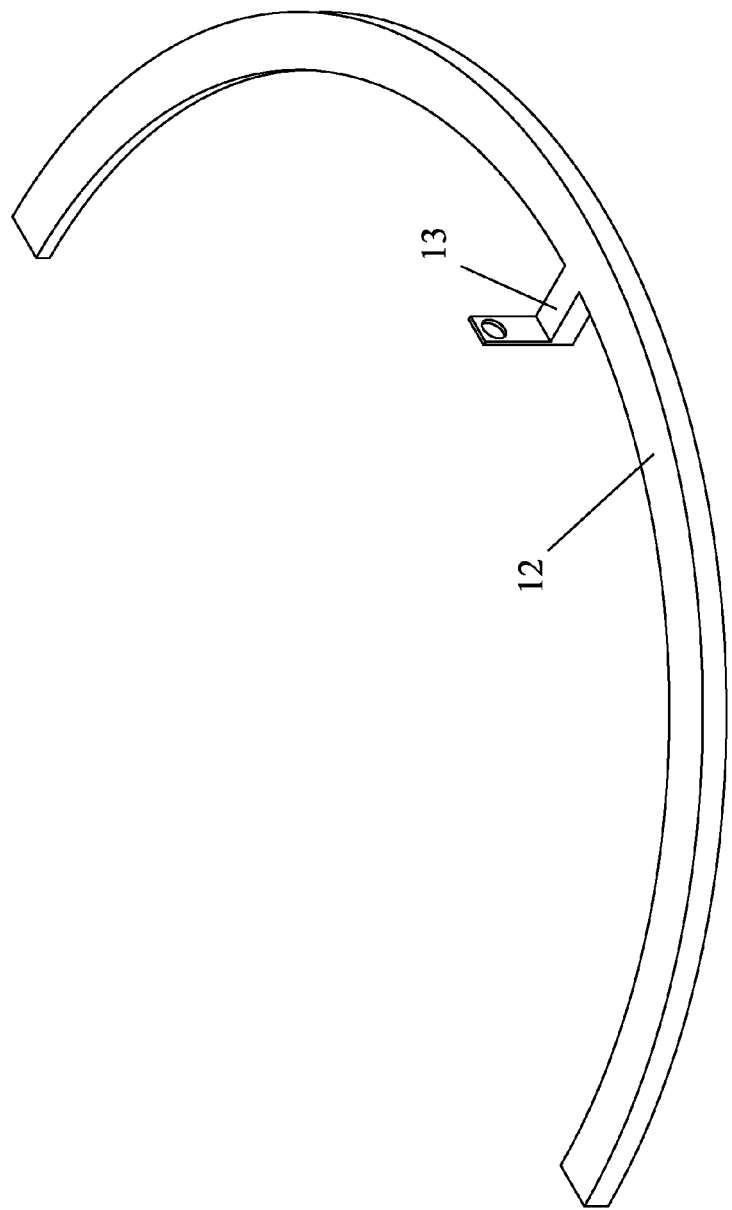
FIG. 4A and FIG. 4B are perspective views of a measuring rod of a multi-image capture device capturing images by means of circular motion according to one embodiment of the invention.
Figure 4B:
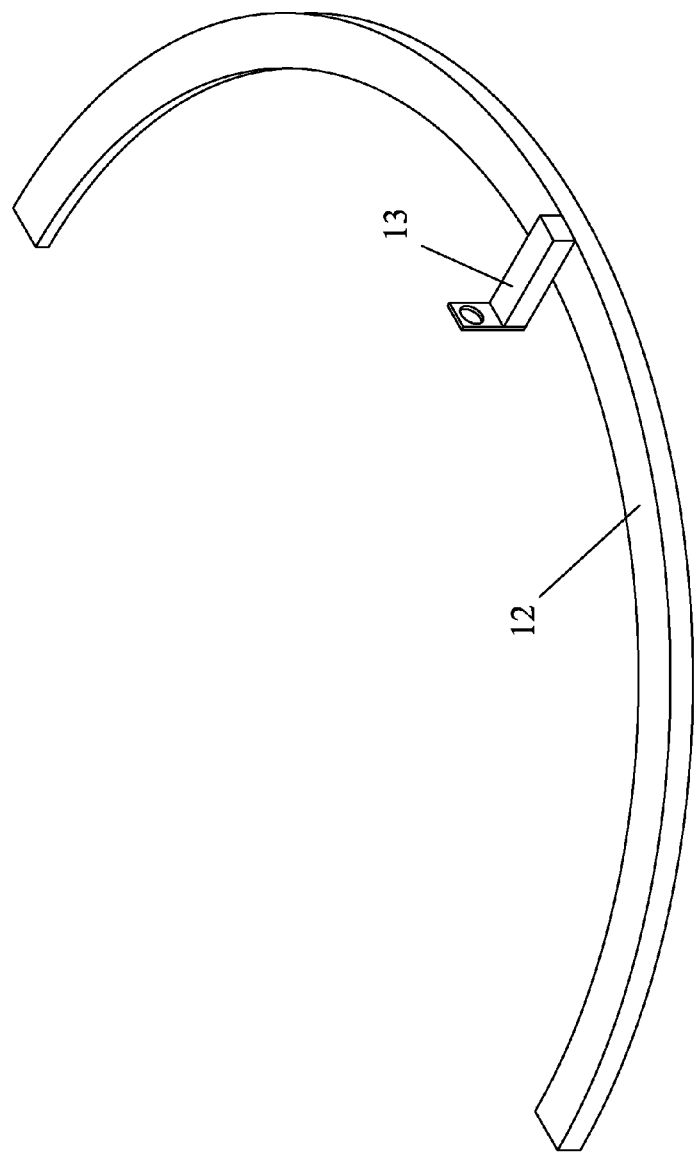

FIG. 4A and FIG. 4B are perspective views of a measuring rod 12 of a multi-image capture device capturing images by means of circular motion according to one embodiment of the invention.

A fixture base 13 extends from the center of the measuring rod 12. Alternately, the fixture base 13 is mounted onto the center of the measuring rod 12 by riveting, screwing or welding. However, the way of connecting the fixture base 13 to the measuring rod 12 is not limited in the invention. The fixture base 13 is used to sustain a first image capture device 31. A central optical axis of the first image capture device 31 goes to overlap the center of the measuring rod 12. The measuring rod 12 further has an angle scale which is used to position the moving location of the moving mechanism 20, as shown in FIG. 2, and used for calculation in image processing.

Figure 5:
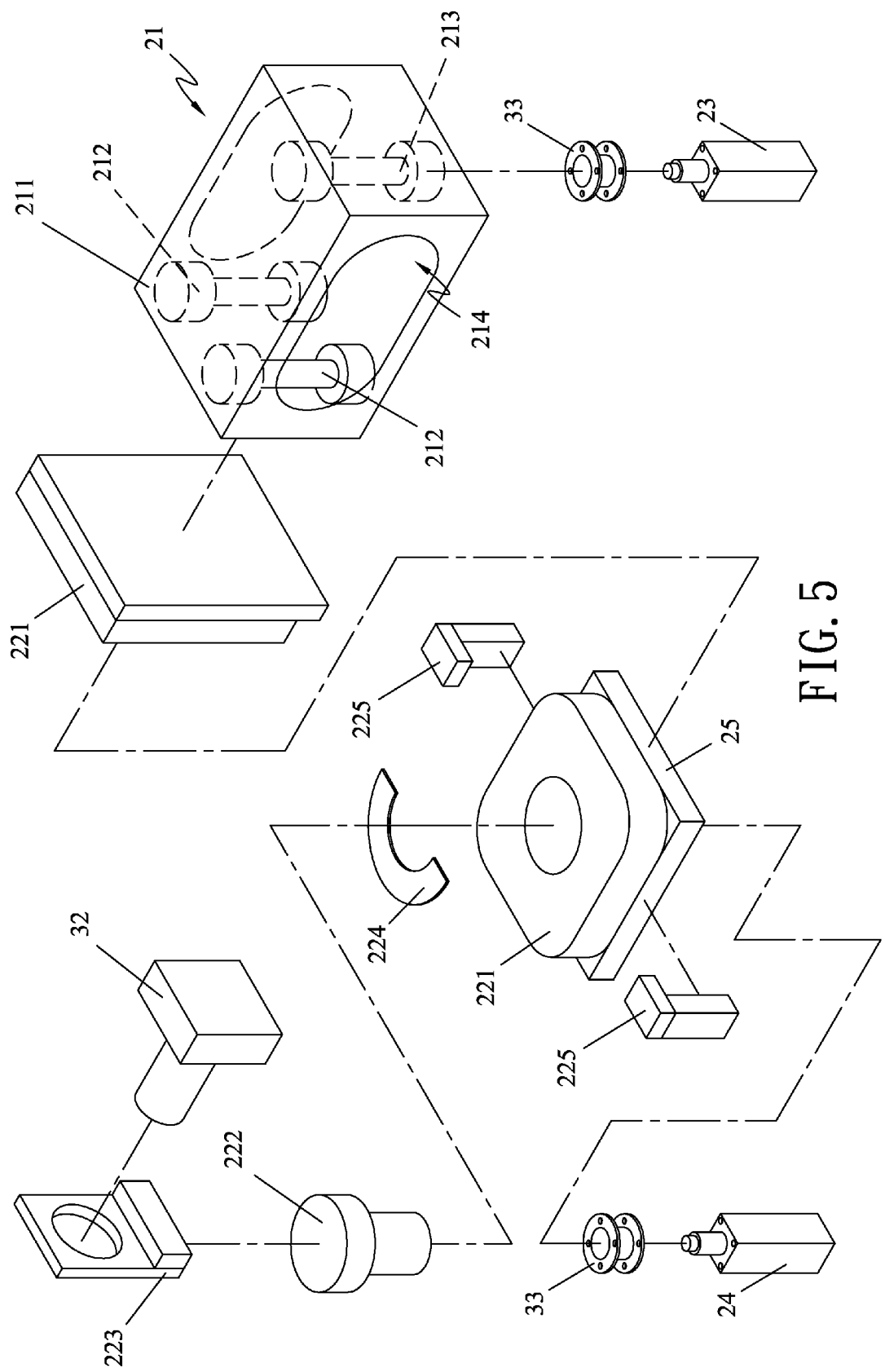
FIG. 5 is an exploded perspective view of a moving mechanism of a multi-image capture device capturing images by means of circular motion according to one embodiment of the invention.

FIG. 5 is an exploded perspective view of a moving mechanism of a multi-image capture device capturing images by means of circular motion according to one embodiment of the invention. The moving mechanism 20 includes a moving base 21, a rotary mechanism 22, a location control device 23 and a rotary control device 24. At a right side and a left side of the fixture base 13 has a moving mechanism 20 respectively in a manner of able to move along the measuring rod 12.

The moving base 21 of the moving mechanism 20 consists of a shell 211, two movable pulleys 212 and a positioning pulley 213. The shell 211 has through hole 214 at each of its right side and left side. The two movable pulleys 212 are set in parallel at a front of the shell 211. The positioning pulley 213 locates inside a rear of the shell 211. The two movable pulleys 212 and the positioning pulley 213 are in isosceles triangle configuration, i.e., the distance between either of the two movable pulleys 212 and the positioning pulley 213 is equal.

By means of such a configuration of the shell 211, the two movable pulleys 212 and the positioning pulley 213, the measuring rod 12 is allowed to penetrate through the through holes 214 of both sides of the shell 211. At a right side and a left side of the fixture base 13, the moving base 21 mounted onto the measuring rod 12 by means of the two movable pulleys 212 and the positioning pulley 213 in a manner that the moving base 21 can move along the measuring rod 12.

The surfaces of the movable pulleys 212 and the positioning pulley 213 are made of material with friction so that their friction force can offer positioning effect to the moving base 21, i.e., the moving mechanism 20.

The rotary mechanism 22 of the moving mechanism 20 is mounted at a front of the moving base 21, i.e., the rotary mechanism 22 is fixed to a front of an exterior of the shell 211 of the moving base 21. The rotary mechanism 22 further includes a rotary base 221, a rotary element 222, a fixture 223, a position-limiting tray 224 and a position-limiting switch 225.

The rotary base 221 of the rotary mechanism 22 is fixed to the front of the moving base 21, i.e., the rotary mechanism 22 is fixed by means of the moving base 21 to the front of the exterior of the shell 211 of the moving base 21. The means to achieve the fixing of the rotary mechanism 22 can be, but not limited to, screwing.

The position-limiting tray 224 and the rotary element 222 locate on the rotary base 221. The position-limiting tray 224 and the rotary element 222 can simultaneously rotate around the moving base 21, i.e., the position-limiting tray 224 and the rotary element 222 simultaneously rotate. The fixture 223 locates on the rotary element 222. The fixture 223 is used to sustain a second image capture device 32, i.e., the second image capture device 32 is driven to rotate by the rotary element 222.

The position-limiting switch 225 locates at both sides of the rotary base 221 and is used to cooperate with the position-limiting tray 224. When the position-limiting tray 224 comes into contact with the position-limiting switch 225, the rotation of the rotary element 222 controlled by the rotary control device 24 stops so as to allow the image-capturing angle of the second image capture device 32 to be within the range of +90° to −90°. In this situation, the position-limiting tray 224 and the position-limiting switch 225 are referred to as a rotary position limiting mechanism 25.

The location control device 23 connects to the positioning pulley 213 of the moving base 21 through a connector 33, and thereby controls the rotation of the positioning pulley 213 so as to control the shift movement along the measuring rod 12 and position of the second image capture device 32 fixed on the rotary mechanism 22. In this embodiment, the location control device 23 can be a step motor, for example, but not intended to limit the scope of the invention in any ways.

On the measuring rod 12 as shown in FIG. 2, further has at least one moving position-limiting mechanism 14 as shown in FIG. 2 to limit the shift movement of the second image capture device 32 on the measuring rod 12. When the shell 211 of the moving base 21 comes into contact with the moving position-limiting mechanism 14, the rotation of the positioning pulley 213 controlled by the location control device 23 stops so that the image capturing moving location of the second image capture device 32 is between the two moving position-limiting mechanisms 14 at left side of the fixture base 13, and between the two moving position-limiting mechanisms 14 at the right side of the fixture base 13.

The rotary control device 24 connects to the rotary element 222 of the rotary mechanism 22 through the connector 33, and controls the rotation of the rotary element 222 so that control the image capturing angle and positioning of the second image capture device 32 fixed on the rotary mechanism 22. In this embodiment, the rotary control device 24 can be, but not limited to, a step motor.

Figure 6:
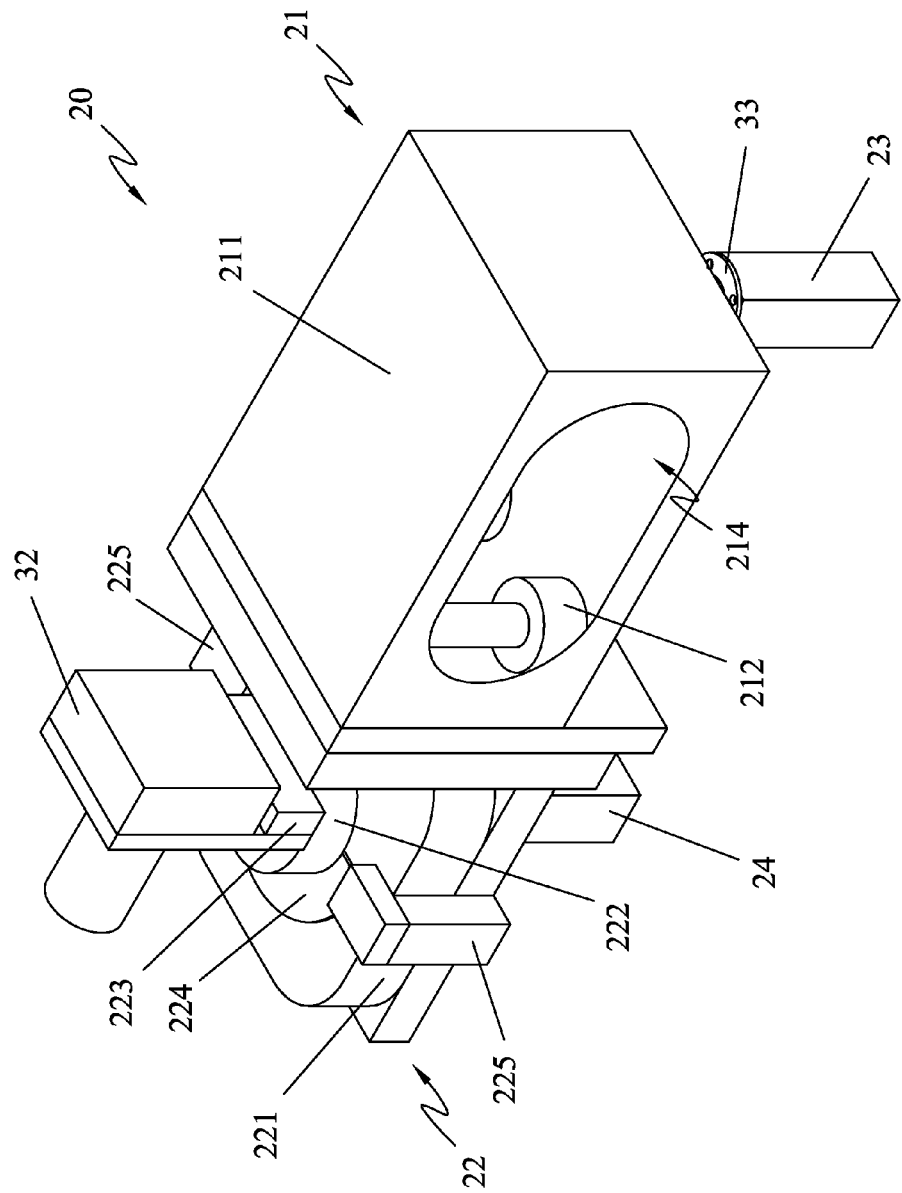
FIG. 6 is a perspective view of a moving mechanism of a multi-image capture device capturing images by means of circular motion according to one embodiment of the invention.

Referring to FIG. 6 which is a perspective view of a moving mechanism of a multi-image capture device capturing images by means of circular motion according to one embodiment of the invention. The moving mechanism 20 includes the moving base 21, the rotary mechanism 22, the location control device 23 and the rotary control device 24.

Figure 7A:
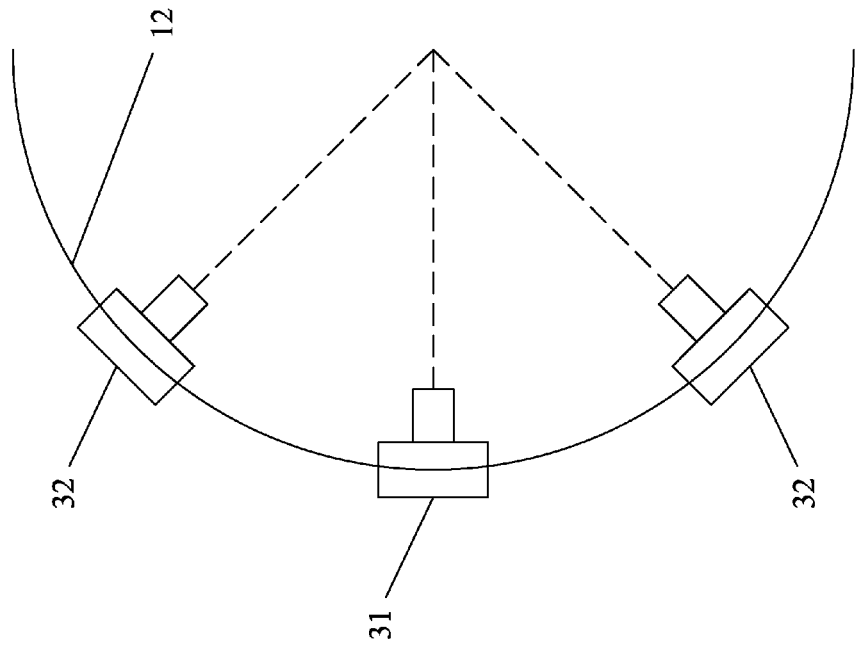
FIG. 7A is a schematic view showing an initial location of a multi-image capture device capturing images by means of circular motion according to one embodiment of the invention.
Figure 7B:
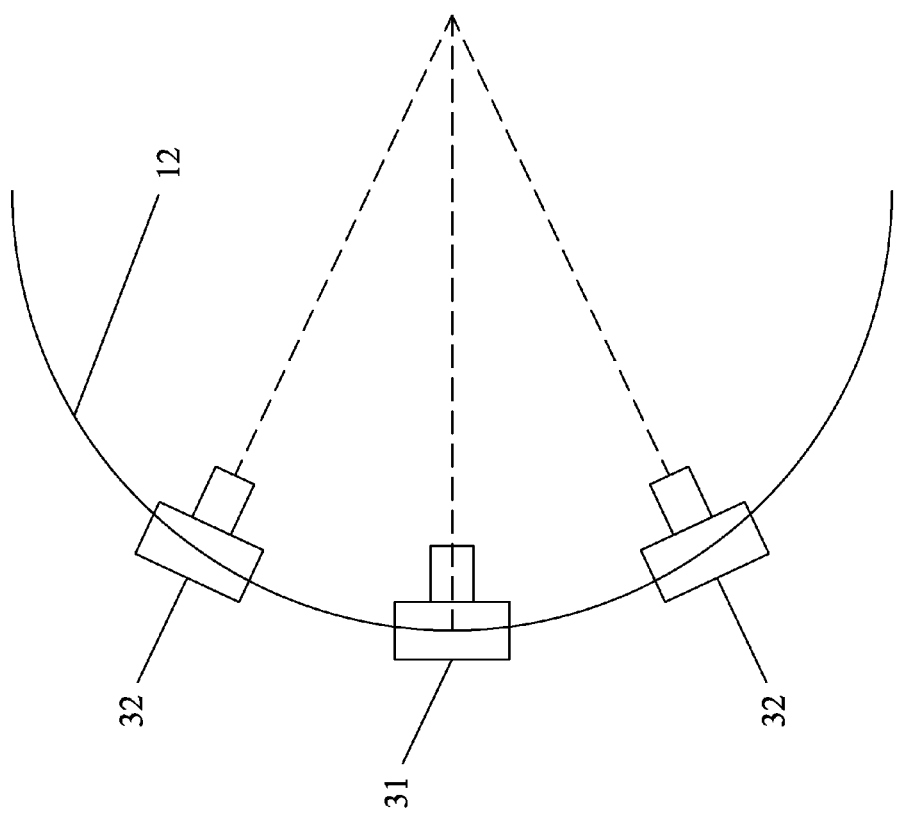
FIG. 7B is a schematic view of positioning of shift movement and angles of a multi-image capture device capturing images by means of circular motion according to one embodiment of the invention.

FIG. 7A is a schematic view showing an initial location of a multi-image capture device capturing images by means of circular motion according to one embodiment of the invention. FIG. 7B is a schematic view of positioning of shift movement and angles of a multi-image capture device capturing images by means of circular motion according to one embodiment of the invention.

The initial locations of the first image capture device 31 and the two second image capture devices 32 of FIG. 7A are determined. At this moment, the rotation of the two second image capture devices 32 are not controlled by the rotary control device 24. While, the central optical axis of the first image capture device 31 and the two image capture device 32 overlap to form a center of a circle where meets the center of the measuring rod 12. This image capturing angle of the first image capture device 31 and the two second image capture devices 32 is defined as 0 degree.

The location control device 23 moves the second image capture device 23 at the left side of the measuring rod 12 as shown in FIG. 7A to the location as shown in FIG. 7B, and also moves the second image capture device 23 at the right side of the measuring rod 12 as shown in FIG. 7A to the location as shown in FIG. 7B. The rotary control device 24 rotates the second image capture device 23 at the left side of the measuring rod 12 to the angle as shown in FIG. 7B, and the second image capture device 23 at the right side of the measuring rod 12 as shown in FIG. 7A. The shift movement and angles of a multi-image capture device as shown in FIG. 7B.

Thereby, the central optical axis of the fixed first image capture device 31 and the two image capture device 32 overlap to form a center of a circle where will not meet the center of the measuring rod 12.

Figure 8:
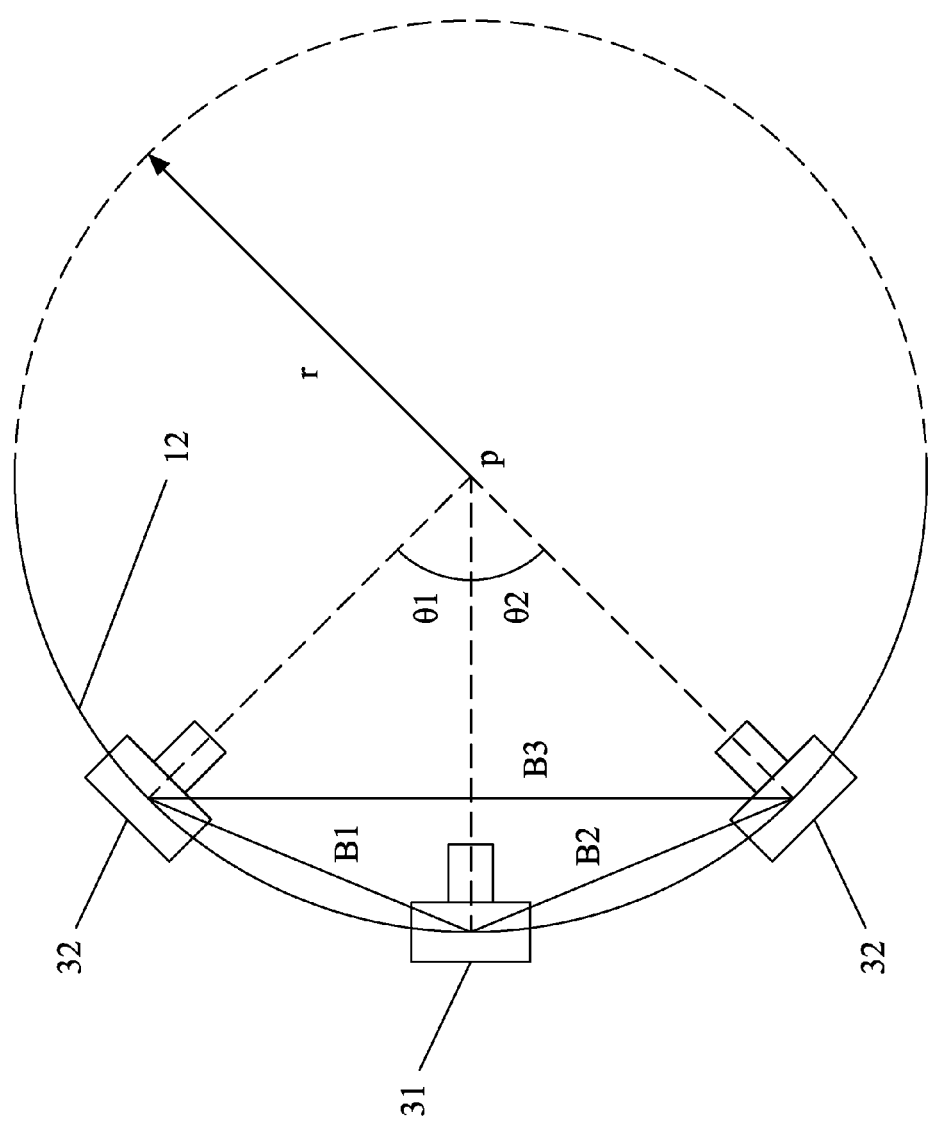
FIG. 8 is a schematic view of an initial location of a multi-image capture device capturing images by means of circular motion according to one embodiment of the invention.

FIG. 8 is a schematic view of an initial location of a multi-image capture device capturing images by means of circular motion according to one embodiment of the invention.

At an initial stage, the distance between the first image capture device 31 and the second image capture device 32 at the left side is defined as a first base line $B_1$. The distance between the first image capture device 31 and the second image capture device 32 at the right side is defined as a second base line $B_2$. The distance between the second image capture device 32 at the left side and the second image capture device 32 at the right side is defined as a third base line $B_3$. The co-radius of the first image capture device 31 and the second image capture device 32 is defined as r. The angle between the first image capture device 31 and the second image capture device 32 at the left side is defined as a first angle $\theta_1$. The angle between the first image capture device 31 and the second image capture device 32 at the right side is defined as a second angle $\theta_2$.

The first base line $B_1$ can be calculated from the co-radius r and the first angle $\theta_1$, i.e. $B_1=2r \sin \theta_1/2$. The second base line $B_2$ can be calculated from the co-radius r and the second angle $\theta_2$, i.e. $B_2=2r \sin \theta_2/2$. The third base line $B_1$ can be calculated from the co-radius r, the first angle $\theta_1$ and the second angle $\theta_2$, i.e., $B_3=2r \sin(\theta_1+\theta_2)/2$, wherein when $\theta_1=\theta_2$, $B_3=2r \sin \theta_1$.

Figure 9A:
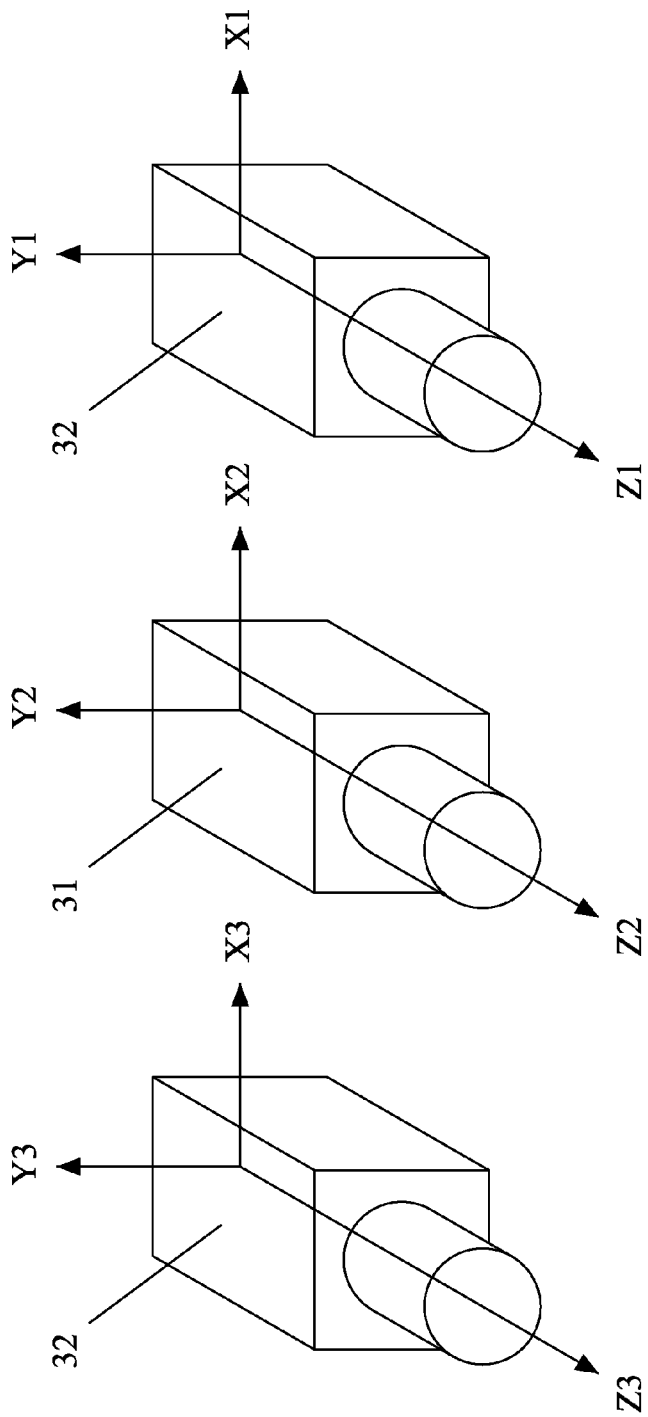
FIG. 9A through FIG. 9C show the transformation of world coordinate from image capture coordinate of a multi-image capture device capturing images by means of circular motion according to one embodiment of the invention.
Figure 9B:
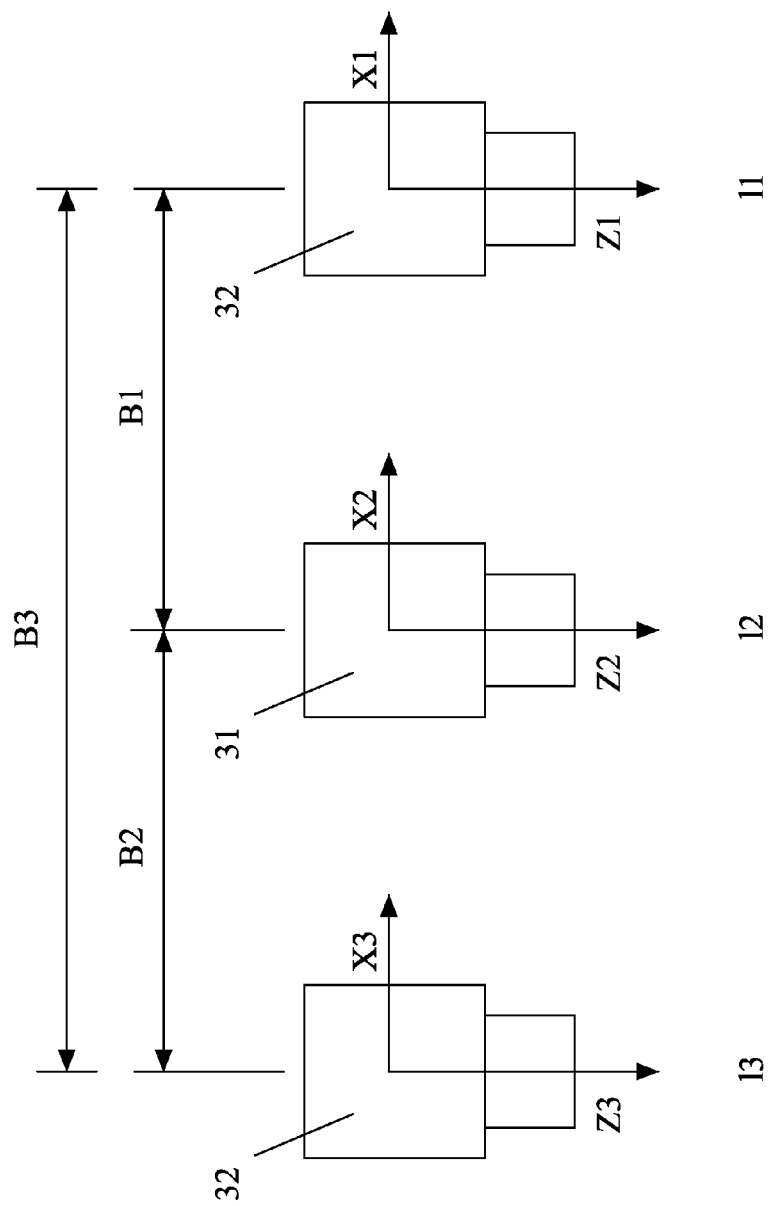
Figure 9C:
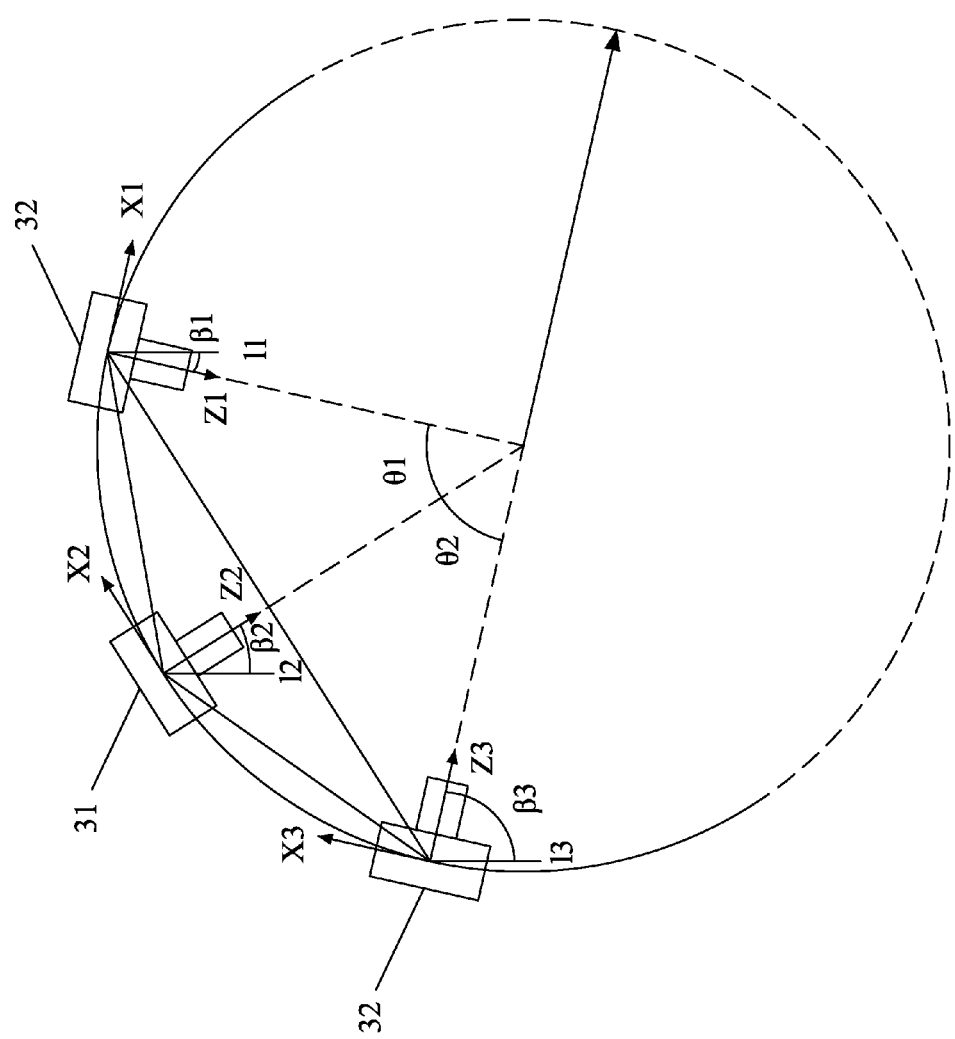

FIG. 9A through FIG. 9C show the transformation of world coordinate from image capture coordinate of a multi-image capture device capturing images by means of circular motion according to one embodiment of the invention.

More specifically, FIG. 9A is a schematic, perspective view of an image capture coordinate of the second image capture device 32 at the left side, the first image capture device 31 and the second image capture device 32 at the right side.

As shown in FIG. 9B, the central optical axis of the second image capture device 32 at the left side, the first image capture device 31 and the second image capture device 32 at the right side are in parallel. The first vector $l_1$ and the second vector $l_2$ are perpendicular to the first base line $B_1$. The second vector $l_2$ and the third vector $l_3$ are perpendicular to the second base line $B_2$. The third vector $l_3$ and the first vector $l_1$ are perpendicular to the third base line $B_3$. The second image capture device 32 at the left side, the first image capture device 31 and the second image capture device 32 at the right side have an angle of a visual axis: $\beta$=0.

As shown in FIG. 9C, the second image capture device 32 at the left side and the first image capture device rotate around Y axis. The optical axis of the second image capture device 32 at the left side and the first image capture device 31 overlap at one point where is defined as a fixation point and generates the angle $\beta$ of a visual axis.

Here below, detailed description will be illustrated about "the first vector $l_1$ and the second vector $l_2$ are perpendicular to the first base line $B_1$". The optical axis of the second image capture device 32 at the left side and the first vector $l_1$ form an angle of a visual axis $\beta_1$, wherein when $\beta_1 > 0$, it means the optical axis is at the right side of the first vector $l_1$. Similarly, the optical axis of the first image capture device 31 and the second vector $l_2$ forms an angle of a visual axis $\beta_2$, wherein when $\beta_2 > 0$, the optical axis is at left side of the second vector $l_2$. The first base line $B_1$ is between the second image capture device 32 at the left side and the first image capture device 31. External parameters are used to obtain the following equation:

$$\overline{B}_1 = \frac{(T_1 - T_2)}{\|T_1 - T_2\|}, \beta_1 = \cos^{-1}(R_1 \cdot B_1), \beta_2 = \cos^{-1}(R_2 \cdot \overline{B}_1)$$

Wherein $\overline{B}_1$ is a unit vector, $T_1$ and $T_2$ are respectively the shift matrix of the second image capture device 32 at the left side and the first image capture device 31. $R_1$ and $R_2$ are respectively the first-row vectors of the second image capture device 32 at the left side and the first image capture device 31.

Figure 10:
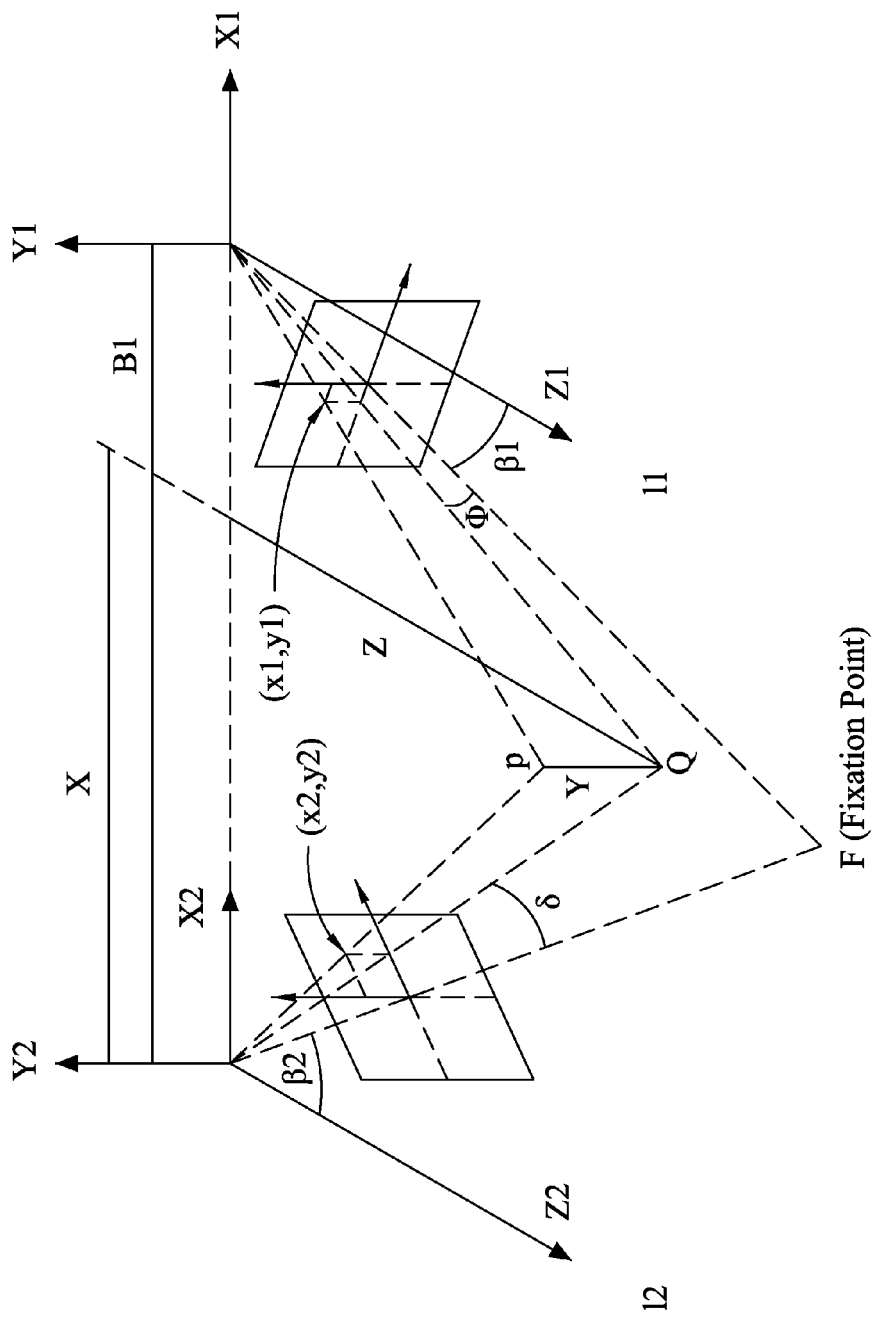
FIG. 10 is a schematic view of a pinhole model of a multi-image capture device capturing images by means of circular motion according to one embodiment of the invention.

FIG. 10 is a schematic view of a pinhole model of a multi-image capture device capturing images by means of circular motion according to one embodiment of the invention.

It is assumed that the tilt angles of the second image capture device 32 at the left side and the first image capture device 31 are the same, a center of a lens of the second image capture device 32 at the left side is defined as an original point, i.e., a center of a lens of the first image capture device 31 is ($B_1$,0,0).

The angle of the visual axis between the second image capture device 32 at the left side and the first vector $l_1$ is $\beta_1$. The angle of the visual axis between the first image capture device 31 and the second vector $l_2$ is $\beta_2$. With the use of the geometric relationship of the second image capture device 32 at the left side and the first image capture device 31, 3D data of a target point P can be calculated from ($x_1$, $y_1$) and ($x_2$, $y_2$):

$$\frac{B_1}{Z} = \tan(\beta_1 + \delta) + \tan(\beta_2 + \Phi)$$

wherein $\delta = \tan^{-1}((x_1 - x_{10})/|f_1|)$, $\Phi = \tan^{-1}((x_2 - x_{20})/|f_2|)$, $f_1$ and $f_2$ means a focal length in unit of pixels. After Z is obtained, the locations of X and Y, and the target point P can be calculated from:

$$X = Z\tan(\beta_1 + \delta) \text{ or } X = b - Z\tan(\beta_2 + \Phi)$$

and $$Y = \frac{(y_1 - y_{10})Z\cos(\delta)}{|f_1|\cos(\beta_1 + \delta)} = \frac{(y_2 - y_{20})|Z|\cos(\Phi)}{|f_2|\cos(\beta_2 + \Phi)}$$

Thereby, the 3D data of the target point P can be found.

In the light of the above, the difference between the invention and the prior art are as follows. According to the invention, the moving mechanism moves along the semi-circular measuring rod, the moving mechanism controlled by the location control device positions while the semi-circular measuring rod moves, and the rotary control device control the positioning of the angle of image capturing of the second image capture device fixed on the rotary mechanism. Thereby, the first image capture device and the second image capture device are of a co-circle configuration which the central optical axis of the first image capture device and the second image capture device overlap to form a center of the co-circle. Such a configuration can broaden the visual range of the image capture device, and allows quick calibration of the image capture device according to positioning of shift movement and image-capturing angles.

Such a technical means can solve the problems existed in the prior art that the visual range is limited and the image capture device needs to be calibrated from time to time. Thereby, not only the visual range can be broadened but also the calibration of the image capture device can be quickly carried out.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A multi-image capture device capturing images by means of circular motion, comprising:
a carrier mechanism, comprising:
a support frame; and
a measuring rod, of semi-circular shape, wherein a fixture base is provided at a center of the measuring rod; the center of the measuring center connects to the support frame; the fixture base is used to sustain a first image capture device; and a central optical axis of the first image capture device goes to overlap the center of the measuring rod; and
two moving mechanisms, wherein the moving mechanisms are respectively mounted on the measuring rod, with one being at a left side of the fixture base and the other at a right side of the fixture base, in a manner of being able to move along the measuring rod; at least one of the moving mechanisms further comprising:
a moving base, consisting of a shell, two movable pulleys and a positioning pulley, wherein a right side and a left side of the shell respectively has a through hole; the movable pulleys are mounted inside a front of the shell; the positioning pulley is mounted inside a rear of the shell; the movable pulleys and the positioning pulley are in isosceles triangle configuration; the measuring rod penetrates through the through hole, and the moving base is driven respectively by the movable pulleys and the positioning pulley to the measuring rod at the right side and left side of the fixture base;
a rotary mechanism, mounted at a front of an exterior of the shell of the moving base and used to fix a second image capture device, the rotary mechanism consisting of a rotary base, rotary element, a fixture, a position-limiting tray and a position-limiting switch, wherein the rotary base is mounted at the front of the exterior of the shell of the moving base; the rotary element is located on the rotary base and the rotary element is rotated around the moving base; the fixture is located on the rotary element, the fixture is used to sustain the second image capture device, and the second image capture device is driven to rotate by the rotary element; the position-limiting tray is located on the rotary base and the position-limiting tray and the rotary element can be simultaneously rotate around the moving base; the position-limiting switch are located at both sides of the rotary base and is used to cooperate with the position-limiting tray, when the position-limiting tray comes into contact with the position-limiting switch, the rotation of the rotary element stops so as to allow the image-capturing angle of the second image capture device to be within the range of +90° to −90°; the position-limiting tray and the position-limiting switch are referred to as a rotary position limiting mechanism;

a location control device, connecting to the positioning pulley to control the rotation of the positioning pulley so as to control shift movement along the measuring rod and positioning of the second image capture device fixed on the rotary mechanism; and a rotary control device, used to control the rotation of the rotary mechanism connecting to the location control device so as to control the image-capturing angle and positioning of the second image capture device fixed on the rotary mechanism;

wherein with the control of positioning of shift movement and image-capturing angle of the second image capture device by the location control device and the rotary control device, the first image capture device and the second image capture device are of a co-circle configuration which the central optical axis of the first image capture device and the second image capture device overlap to form a center of a co-circle.

2. The multi-image capture device capturing images by means of circular motion of claim 1, wherein the fixture base extends from a center of the measuring rod.

3. The multi-image capture device capturing images by means of circular motion of claim 1, wherein the fixture base is fixed at the center of the measuring rod.

4. The multi-image capture device capturing images by means of circular motion of claim 3, wherein the fixture base is fixed at the center of the measuring rod by riveting, screwing or welding.

5. The multi-image capture device capturing images by means of circular motion of claim 1, wherein the measuring rod further has an angle scale.

6. The multi-image capture device capturing images by means of circular motion of claim 1, wherein the location control device and the rotary control device are step motors.

7. The multi-image capture device capturing images by means of circular motion of claim 1, wherein the surfaces of the movable pulleys and the positioning pulley are made of material with friction so that their friction force can offer positioning effect to the second image capture device when the second image capture device moves along the measuring rod.

8. The multi-image capture device capturing images by means of circular motion of claim 1, wherein the measuring rod further comprises at least one moving position-limiting mechanism to limit the shift movement of the second image capture device on the measuring rod.

9. The multi-image capture device capturing images by means of circular motion of claim 1, wherein when the central optical axis of the first image capture device and the two image capture device overlap to form a center of a circle where meets the center of the measuring rod, the image-capturing angle of the first image capture device and the two second image capture devices is defined as 0 degree.

10. The multi-image capture device capturing images by means of circular motion of claim 1, wherein the distance between the first image capture device and the second image capture device is defined as a base line; the base line can be calculated from trigonometric functions having a radius of co-circle and an angle of optical axis of the first image capture device and the second image capture device, and the central optical axis of the first image capture device and the second image capture device overlap to form a center of the co-circle.

* * * * *